United States Patent [19]

Highley

[11] 4,052,140

[45] Oct. 4, 1977

[54] METHOD OF AND APPARATUS FOR GENERATING A HOT GAS

[75] Inventor: John Highley, Cheltenham, England

[73] Assignee: Coal Industry (Patents) Limited, London, England

[21] Appl. No.: 677,869

[22] Filed: Apr. 19, 1976

[30] Foreign Application Priority Data

May 28, 1975 United Kingdom ............ 23356/75

[51] Int. Cl.² .............................................. F23D 3/40
[52] U.S. Cl. ..................................... 431/7; 110/28 J; 431/170; 432/58
[58] Field of Search ................. 431/7, 170; 110/28 J; 432/58; 34/57 A

[56] References Cited

U.S. PATENT DOCUMENTS

| 3,625,165 | 12/1971 | Ishigaki | 110/28 J X |
| 3,636,896 | 1/1972 | McLaren et al. | 110/28 J X |
| 3,893,426 | 7/1975 | Bryers | 110/28 J X |
| 3,921,590 | 11/1975 | Mitchell et al. | 110/28 J X |

Primary Examiner—Edward G. Favors
Attorney, Agent, or Firm—Stevens, Davis, Miller & Mosher

[57] ABSTRACT

A hot gas is generated by passing the gas to be heated through a fluidized heating bed to fluidize the bed and to receive heat from the bed to which hot bed material is circulated from an adjacent fluidized combustion bed. An intermediate combustion bed may be interposed between the heating and combustion beds to burn any burnt matter prior to its passage to the heating bed thereby avoiding or reducing contamination of the gas to be heated.

8 Claims, 1 Drawing Figure

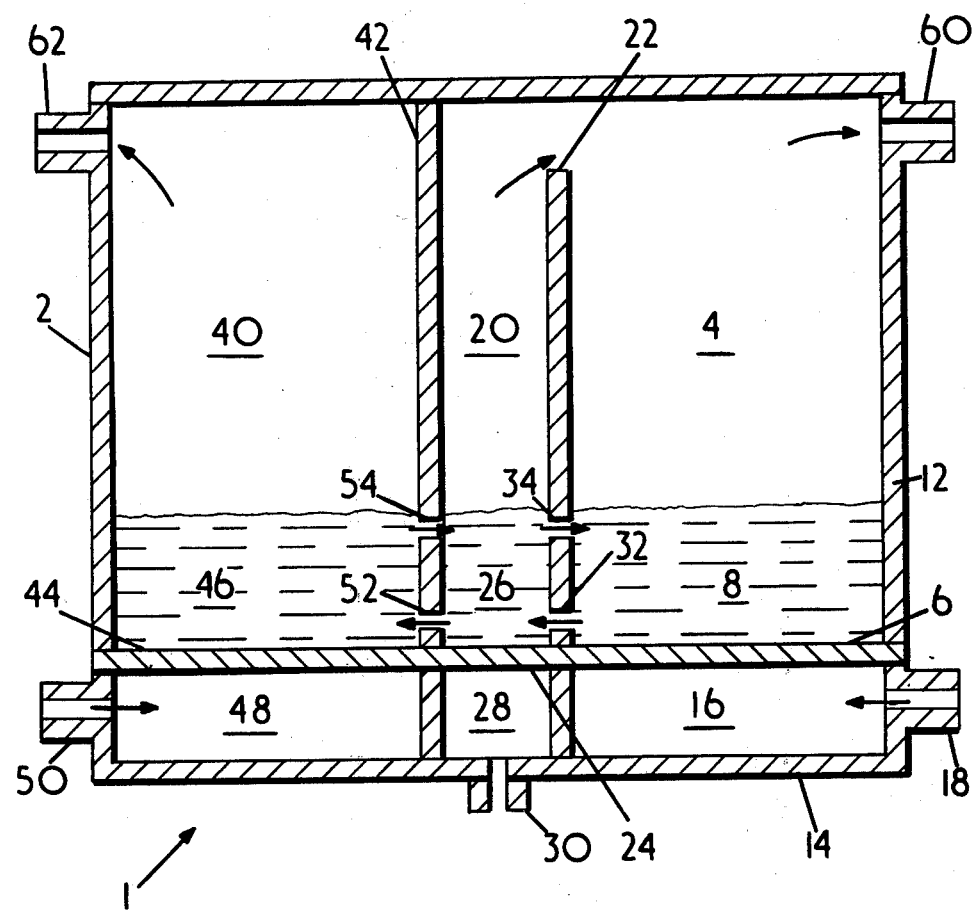

METHOD OF AND APPARATUS FOR GENERATING A HOT GAS

This invention relates to a method of and apparatus for generating a hot gas.

Particularly, the invention has reference to the generation of a hot gas free, or substantially free, of contamination, by the combustion of a fuel in a fluidised bed.

One known method of hot gas generation involves the use of a fluidised bed in which fuel is burnt to generate heat and the disposition of heat exchange tubing within the bed, the gas to be heated being passed through the tubing for heat exchange. This method was used because of the high heat transfer coefficient attainable between the bed and the tubing. However, it has been found that the heat transfer coefficient between the tubing and the gas flowing through it is relatively low. It is possible to improve the heat transfer coefficient between the tubing and the gas by increasing the pressure: however, this has the disadvantage of higher running costs in some applications.

An object of the present invention is therefore to provide an improved method of generating a hot gas substantially free of contamination by employing a fluidised bed.

A further object of the present invention is to provide apparatus for carrying out the method.

According to a first aspect of the invention there is provided a method of generating a hot gas, the method including the steps of forming a first fluidised bed of particulate material, causing a fuel to be burnt in the first fluidised bed to generate heat, forming a second fluidised bed of particulate material, passing a gas to be heated through the second bed, and circulating heat conductive material between the first and second beds to heat the second bed to transfer heat to the gas passing therethrough to generate a hot gas.

An intermediate bed may be formed to serve as an auxiliary combustion zone for any unburnt fuel circulated from the first bed and to ensure that no combustible matter passes to the second bed thereby to prevent contamination of the gas to be heated.

In the method of the invention, the fluidising medium for the first bed and the gaseous products of combustion issuing from the first bed are kept entirely separate from the gas to be heated.

The gaseous products of combustion from the first bed and the intermediate bed, if provided, are at an elevated temperature and may advantageously be passed to a heat recovery zone. The heat extracted from these products may be employed to preheat the gas to be heated prior to its passage through the second bed and/or to preheat the fluidising medium for the first bed or for both the first bed and the intermediate bed if such is provided. Alternatively the heat extracted from these gaseous products of combustion may be employed for steam raising or other separate process.

The fuel may be a solid, a liquid or a gas.

According to a second aspect of the invention, there is provided apparatus for generating a hot gas, the apparatus including a generator body containing a first, fluidised bed combustion zone having a fuel inlet, a fluidising medium inlet and a gas outlet for the first zone, a second, fluidised bed heating zone, a gas inlet and a gas outlet for the second zone, and means for circulating material between the first and second zones.

An intermediate fluidised bed combustion zone may be included within the generator body interposed between the first and second zones.

A further fluidising medium inlet may be located in the generator body for the intermediate zone.

The means for the circulation of bed material may conveniently comprise ducting or apertures intercommunicating the first zone with the second zone. When an intermediate zone is provided additional means for circulation are provided between the first zone and the intermediate zone and between the intermediate zone and the second zone. The circulation of bed material may be induced and varied by employing different fluidised velocities in the zones, by employing gas jets to direct the flow of solids, or by any other means.

By way of example only, a method and apparatus for generating a hot gas are described below with reference to the accompanying drawing which is a side sectional view.

Referring to the drawing, apparatus for generating a hot gas is indicated generally at 1 and includes a generator body 2 divided internally into three zones. A first zone 4 is a combustion zone and has a gas-permeable grid 6 for supporting a fluidised bed 8 of particulate material. A fuel inlet (not shown) communicates with zone 4 and is located in wall 12 of the generator body 2 above the grid 6. Between the grid 6 and base 14 of the generator body 2 is defined a plenum chamber 16 provided with a fluidising medium inlet 18.

An intermediate combustion zone 20 is disposed adjacent zone 4 and is divided therefrom by a wall 22. The zone 20 has a gas-permeable grid 24 for supporting a fluidised bed 26 of particulate material and beneath the grid 24 there is provided a plenum chamber 28 having a fluidising medium inlet 30. The wall 22 has two apertures 32, 34, the aperture 32 being positioned towards the lower portion of the wall and the aperture 34 being spaced upwardly therefrom in the vicinity of the surfaces of the beds 8 and 26. These apertures 32, 34 thus provide an intercommunication between zones 4 and 20 and constitute means for circulating the material of the two beds.

A heating zone 40 is provided within the generator body 2 adjacent the intermediate zone 20 and is separated from zone 20 by a wall 42. The zone 40 has a gas-permeable grid 44 which, in use, supports a fluidised bed 46 of particulate material. A plenum chamber 48 is disposed beneath the grid 44 between the base 14 of the generator body 2 and the grid 44. A gas inlet 50 is provided for the chamber 48. The wall 42 has two apertures 52, 54 disposed in a similar manner to apertures 32, 34 of wall 22.

The generator body 2 has two gas outlets 60, 62. The gas outlet 60 communicates with zone 4 and zone 20 and the gas outlet 62 communicates with zone 40 only.

In operation, the bed 8 is fluidised by the upward flow of a fluidising medium, e.g. air, supplied to plenum chamber 16 through inlet 18 and thence through grid 6. Fuel, which may be a liquid, a gas or a solid, e.g. coal, is introduced into the bed 8 and is burnt within the bed 8 in zone 4 to heat the bed. A fluidising medium, e.g. air is fed through inlet 30 into plenum chamber 28 and thence passes through the grid 24 to fluidise the bed 26, in zone 20. In order to heat the bed 26 material is circulated between the beds 8, 26 through the apertures 32, 34 in the manner indicated by the arrows in the drawing. In this manner the temperature of the material of which bed 26 is composed rises and, furthermore, any fuel which has not been completely burnt in bed 8 is subject to further combustion in bed 26.

A gas to be heated is introduced through the inlet 50 into chamber 48 and passes upwardly through the grid 44 to fluidise the bed 46 in zone 40. The bed 46 is heated by the circulation of material between beds 26 and 46. This circulation is effected through apertures 52, 54 in the manner indicated by the arrows.

Hot bed material from zone 4 is thus circulated to zone 40 via the intermediate zone 20 in which any unburnt fuel passing from bed 8 to bed 26 is completely burnt. The hot material which is finally circulated to bed 46 of zone 40 is thus free of any matter which could cause contamination of the gas passing through zone 40: such contamination might be for example the production of a combustion gas through the burning of fuel only partially burnt in zone 4 if the intermediate zone were not provided.

A clean hot gas is therefore generated in zone 40 and exhausts through gas outlet 62. The gaseous products of combustion issuing from zones 4 and 20 combine and pass through outlet 60 whence they may be directed to a heat exchanger (not shown) for preheating the gas to be passed through zone 40. Alternatively, or in addition, these products may be used for preheating the fluidising medium used for zones 4 and 20. As a further alternative, the gaseous products of combustion may be employed for steam raising or other heating process.

In order to enhance the heat transfer between the zones 4, 20 and 40, heat pipes may be provided through the walls 22 and 42.

The apparatus is operated at a pressure appropriate to the use to be made of the hot gas. Thus to provide a hot gas for industrial heating processes it will be operated at slightly above atmospheric pressure. To provide a gas for expansion through a gas turbine for power generation, the apparatus will be operated at a pressure of several atmospheres, e.g. 5 to 20 atmospheres. In this and other applications where the hot gas generated may contain combustion products and a low concentration of particulates, the intermediate zone 20 may be dispensed with such that particles circulate directly between zones 4 and 40. Also the combustion gases from the combustion zone may be passed through devices, e.g. cyclones, to remove particulates and then mixed with the hot gas generated.

I claim:

1. A method of generating a hot gas including the steps of forming a first fluidised bed of particulate material, introducing a fuel into the first bed, burning the fuel in the first bed to generate heat, forming a second fluidised bed of particulate material, passing a gas to be heated through the second bed, and circulating heat conductive particulate material between the first and second beds to heat the second bed to transfer heat to the gas passing therethrough thereby to generate a hot gas.

2. A method as claimed in claim 1 wherein an intermediate fluidised bed is interposed between the first and second beds, and heat conductive particulate material is circulated between the first and second beds via the intermediate bed.

3. A method as claimed in claim 1 wherein the fluidising medium for the first bed and gaseous products of combustion issuing from the first bed are kept separate from the gas to be heated.

4. A method as claimed in claim 1 wherein the circulation of heat conductive particulate material is varied.

5. A method as claimed in claim 4 wherein the circulation of heat conductive particulate material is varied by varying the fluidising velocity in the fluidised beds.

6. Apparatus for generating a hot gas including a generator body, a first fluidised bed combustion zone within the body, a fuel inlet to said combustion zone, a fluidising medium inlet and a gas outlet for the first zone, a second fluidised bed heating zone within the body, a gas inlet and a gas outlet for the second zone, an intermediate fluidised bed combustion zone provided within the generator body interposed between the first and second zones, and means for circulating material between the first and second zones.

7. Apparatus as claimed in claim 6 wherein a fluidising medium inlet is provided for the intermediate zone.

8. Apparatus as claimed in claim 6 wherein the means for circulating bed material includes aperture means intercommunicating the zones.

* * * * *